United States Patent
Inagaki et al.

(10) Patent No.: US 9,587,682 B2
(45) Date of Patent: Mar. 7, 2017

(54) DAMPER STRUCTURE FOR CLUTCH

(71) Applicant: Kawasaki Jukogyo Kabushiki Kaisha, Hyogo (JP)

(72) Inventors: Yoshihiko Inagaki, Kakogawa (JP); Yasushi Nakamura, Osaka (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 14/719,080

(22) Filed: May 21, 2015

(65) Prior Publication Data

US 2015/0345567 A1 Dec. 3, 2015

(30) Foreign Application Priority Data

May 29, 2014 (JP) ................................. 2014-111344

(51) Int. Cl.
*F16F 15/12* (2006.01)
*F16D 13/58* (2006.01)
*F16D 13/52* (2006.01)
*F16F 15/136* (2006.01)

(52) U.S. Cl.
CPC ............. *F16D 13/58* (2013.01); *F16D 13/52* (2013.01); *F16D 2300/22* (2013.01); *F16D 2300/26* (2013.01); *F16F 15/136* (2013.01)

(58) Field of Classification Search
CPC .......... F16D 13/52; F16D 13/54; F16D 13/56; F16D 2013/565; F16D 3/14; F16D 3/70; F16D 2300/22
See application file for complete search history.

(56) References Cited

U.S. PATENT DOCUMENTS

| | | | | |
|---|---|---|---|---|
| 2,122,837 A | * | 7/1938 | Guy | F16D 3/70 464/137 |
| 2,930,210 A | * | 3/1960 | Farmer | F16D 3/70 464/72 |
| 6,056,096 A | * | 5/2000 | Fukushima | F16D 13/70 192/110 B |
| 6,145,642 A | * | 11/2000 | Acker | F16D 13/757 192/111.19 |
| 7,600,625 B2 | * | 10/2009 | Ishikawa | F16D 43/18 192/105 CD |
| 2006/0243555 A1 | * | 11/2006 | Lewis | F16D 13/52 192/70.2 |
| 2011/0192699 A1 | * | 8/2011 | Yazaki | F16D 13/52 192/70.12 |
| 2015/0260236 A1 | * | 9/2015 | Inayama | F16D 13/74 192/70.12 |

FOREIGN PATENT DOCUMENTS

JP 03-002031 1/1991

* cited by examiner

*Primary Examiner* — Ramya Burgess
*Assistant Examiner* — Lillian Nguyen

(57) ABSTRACT

A clutch includes a clutch housing configured to hold a clutch plate, and a clutch gear configured to transmit rotary drive power to the clutch housing via a damper. The clutch housing has a rib that regulates a position, of the damper, in an axial direction. The dampers are accommodated in accommodation holes that are spaced from each other in a circumferential direction of the clutch gear. The rib is formed in an annular shape so as to be aligned with the accommodation holes.

6 Claims, 7 Drawing Sheets

DAMPER STRUCTURE FOR CLUTCH

CROSS REFERENCE TO THE RELATED APPLICATION

This application is based on and claims Convention priority to Japanese patent application No. 2014-111344, filed May 29, 2014, the entire disclosure of which is herein incorporated by reference as a part of this application.

BACKGROUND OF THE INVENTION

Field of the Invention

The present invention relates to a damper structure of clutches for use in internal combustion engines for vehicles, mainly for saddle-riding type vehicles such as motorcycles, three-wheeled vehicles, and four-wheeled buggies.

Description of Related Art

As clutches for use in internal combustion engines of vehicles, it has been known that a clutch that has a damper, for damping torque, is interposed between a driving-side rotary member and a driven-side rotary member, and absorbs variation in torque that is generated in a power transmission system for an internal combustion engine (for example, JP Examined Utility Model Publication No. 03-002031).

In a structure having such a damper, a deformation margin for the damper needs to be assuredly provided in order to reduce shock. However, in a case where an axial clearance between the damper and the driven-side rotary member is increased so as to assuredly obtain such a deformation margin, an axial position of the damper is rendered to be unstable. Further, in a case where the axial clearance is increased, the outer circumferential surface of the damper to be pressed by a clutch gear of the driving-side rotary member is offset in the axial direction, and a portion of the outer circumferential surface of the damper may not be pressed, which may increase a load per unit area of the outer circumferential surface of the damper accordingly. Therefore, a width (dimension in the axial direction) of the clutch gear needs to be increased, which leads to increase in weight.

SUMMARY OF THE INVENTION

An object of the present invention is to provide a damper structure, for clutches, which allows a deformation margin for a damper to be assuredly provided while stabilizing a position, of the damper, in the axial direction.

In order to accomplish the above object, a damper structure for a clutch according to the present invention includes: a clutch housing configured to hold a clutch plate; a clutch gear configured to transmit rotary drive power to the clutch housing via a damper; and a rib that regulates a position of the damper in an axial direction.

In the above configuration, since the clutch housing has the rib that regulates the position of the damper in the axial direction, the position of the damper in the axial direction is stable. Further, a clearance in the axial direction is formed between the damper and the rib. Therefore, when the damper absorbs shock, the damper is deformed toward the clearance around the rib, and thus, a deformation margin is assuredly obtained to exhibit damper effect, and also deterioration of the damper due to compressive force is reduced to maintain the damper effect. Further, the rib allows the position, of the damper, in the axial direction to be stable, and therefore, the widthwise dimension (the dimension in the axial direction) of the clutch gear need not be increased. Thus, the weight is not increased.

In the preferred embodiment of the present invention, a plurality of the dampers are accommodated in a plurality of accommodation holes that are spaced from each other in a circumferential direction of the clutch gear, and the rib is formed in an annular shape so as to be aligned with the plurality of accommodation holes. In this configuration, the rib can be easily formed.

Where the rib is formed in the annular shape, a widthwise dimension of the rib in a radial direction is preferably set within the range of $1/20$ to $1/5$ of an inner diameter of the accommodation holes. When the widthwise dimension of the rib in the radial direction is less than $1/20$ of the inner diameter of the accommodation hole, the position of the damper in the axial direction is unstable. On the other hand, when the widthwise dimension of the rib in the radial direction is greater than $1/5$ of the inner diameter of the accommodation hole, the deformation margin for the damper may not be sufficient.

Where the rib is formed in the annular shape, the clutch housing preferably has engagement projections that engage with engagement holes formed at center portions of the dampers, and the rib is preferably formed so as to connect to the engagement projections. In this configuration, the dampers can be stably supported in the clutch housing. Further, root portions of the engagement projections are reinforced by the rib.

Where the rib is formed in the annular shape, a projection height of the rib from the clutch housing is preferably set within the range of 0.5 mm to 1.5 mm. When the projection height is less than 0.5 mm, the deformation margin for the damper may not be sufficient. When the projection height is greater than 1.5 mm, the size of the clutch is increased.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
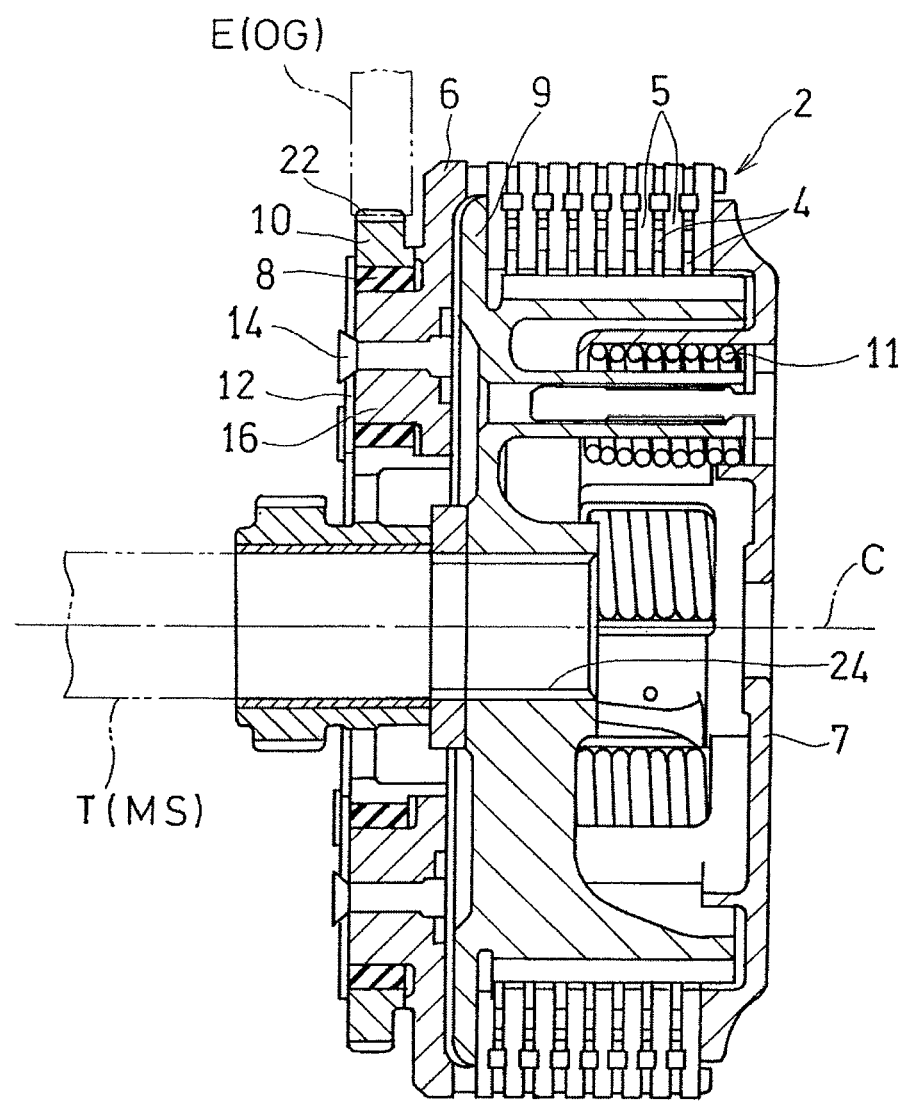
FIG. 1 is a longitudinal cross-sectional view of a clutch having a damper structure according to a preferred embodiment of the present invention.

Hereinafter, a preferred embodiment of the present invention will be described with reference to the drawings. FIG. 1 is a cross-sectional view of a clutch having a damper structure according to a preferred embodiment of the present invention.

A clutch 2 is in the form of a friction plate clutch, and is disposed between an engine E and a transmission T of a vehicle such as a motorcycle, so as to connect or disconnect power, of the engine E, to be transmitted to the transmission T. More specifically, the clutch 2 having a clutch gear 10 is mounted to a main shaft MS of the transmission T, and the clutch gear 10 meshes with an output gear OG mounted to a rotation shaft of the engine E. The main shaft MS is spline-fitted to an output tooth portion 24 of the clutch 2, and is connected to the clutch 2 so as not to rotate relative to each other.

A clutch housing 6 is connected to the clutch gear 10 of the clutch 2 via a damper 8, and a plurality of friction plates 5 are supported on an outer circumferential portion of the clutch housing 6 so as to be movable in the axial direction of a shaft center C. Further, a clutch hub 9 is disposed, on an inner circumferential side of the clutch housing 6, so as to connect to the main shaft MS, and a plurality of clutch plates 4 are disposed, on the outer circumference of the clutch hub 9, so as to be movable in the axial direction of the shaft center C. The clutch plates 4 and the friction plates 5 are aligned alternately in the axial direction.

A pressing plate 7 is disposed so as to sandwich the friction plates 5 and the clutch plates 4 between the clutch hub 9 and the pressing plate 7. By the pressing plate 7 being pressed toward the clutch hub 9 by a clutch spring 11, the clutch 2 enters a connecting state, and rotary drive power of the engine E, before being transmitted to the main shaft MS of the transmission T, is transmitted to the clutch 2 via the clutch gear 10 and the damper 8. Furthermore, a push rod (not shown) is pushed in the axial direction of the shaft center C (rightward in FIG. 1) according to a driver operating the clutch, whereby the pressing plate 7 is moved rightward against the clutch spring 11, so that the clutch 2 enters a disconnecting state to disconnect transmission of torque from the clutch 2.

Figure 2:
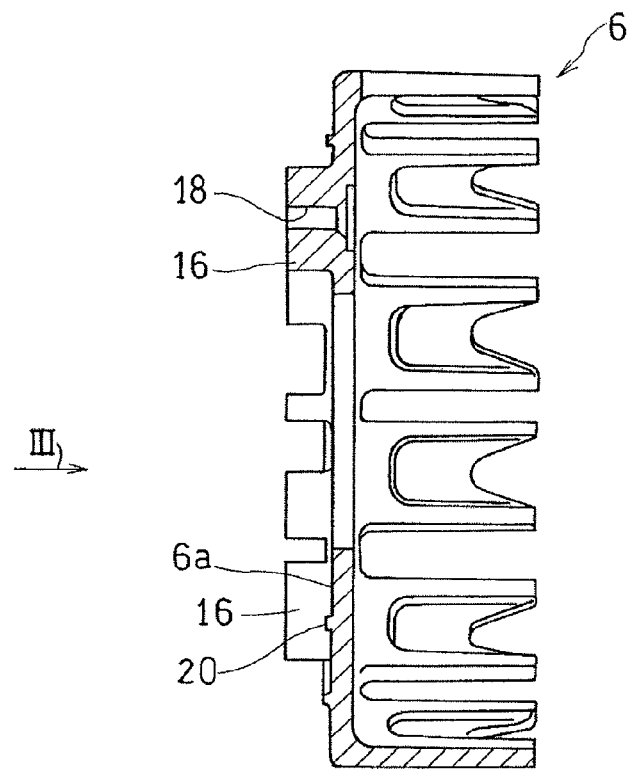
FIG. 2 is a longitudinal cross-sectional view of a clutch housing of the clutch.
Figure 3:
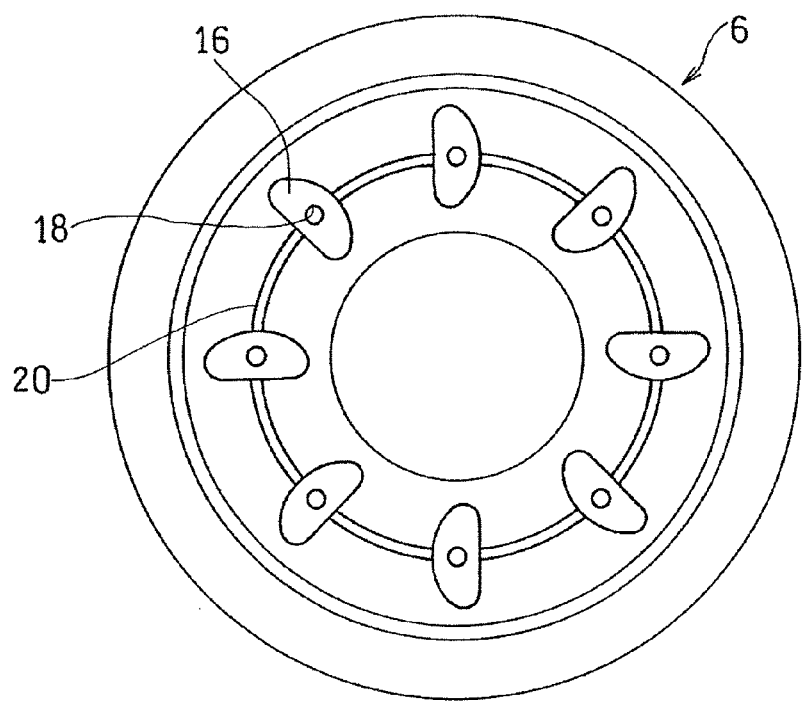
FIG. 3 is a front view of the clutch housing as viewed in the axial direction.

FIG. 2 is a longitudinal cross-sectional view of the clutch housing 6, and FIG. 3 is a rear view of the clutch housing 6 as viewed from the left side III in FIG. 2. The clutch housing 6 is made of an aluminium alloy, and has a plurality of engagement projections 16 that are disposed on one end surface 6a of the clutch housing 6 and project in the axial direction as shown in FIG. 2. The engagement projections 16 are equally spaced from each other in the circumferential direction of the clutch housing 6. Each of the engagement projections 16 has, at its radial center portion, a rivet insertion hole 18 that is a through hole extending in the axial direction.

Furthermore, on the one end surface 6a of the clutch housing 6, a rib 20 that regulates a position, of the damper 8, in the axial direction is formed. The rib 20 is formed so as to connect to the engagement projections 16, that is, connect to root portions of the engagement projections 16. The rib 20 is formed in an annular shape so as to be concentric with the clutch housing 6 as shown in FIG. 3. The rib 20 and the engagement projections 16 are integrally formed with the clutch housing 6. Two or more ribs 20 may be aligned in the radial direction.

Figure 4:
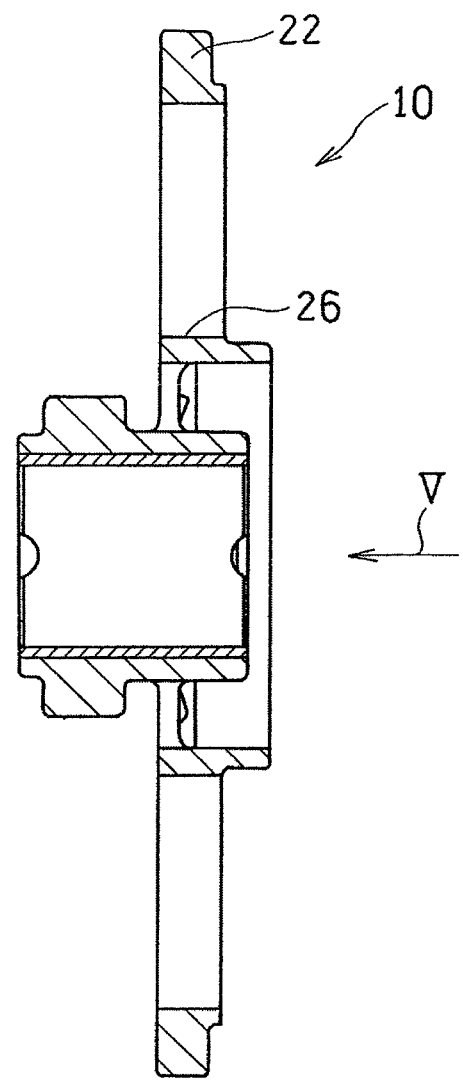
FIG. 4 is a longitudinal cross-sectional view of a clutch gear of the clutch.
Figure 5:
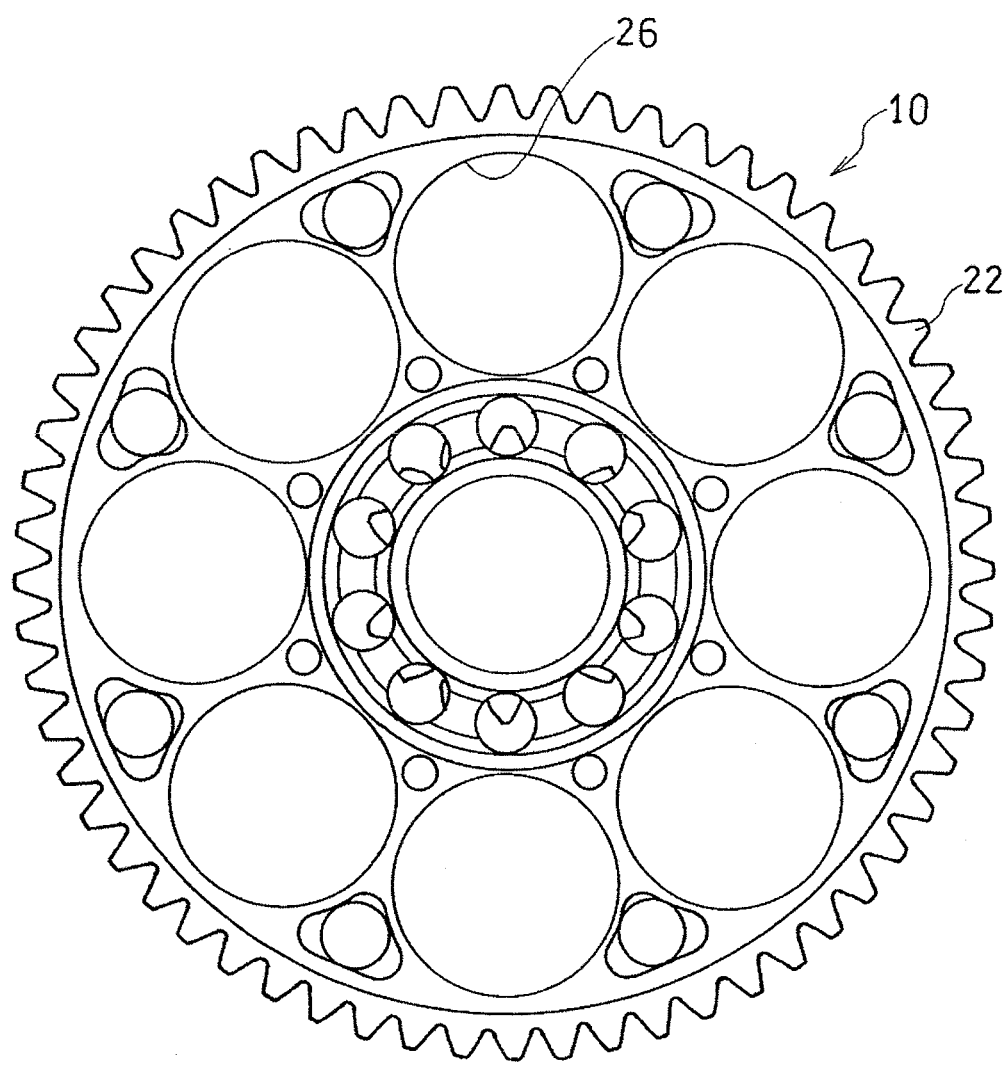
FIG. 5 is a front view of the clutch gear as viewed in the axial direction.
Figure 8:
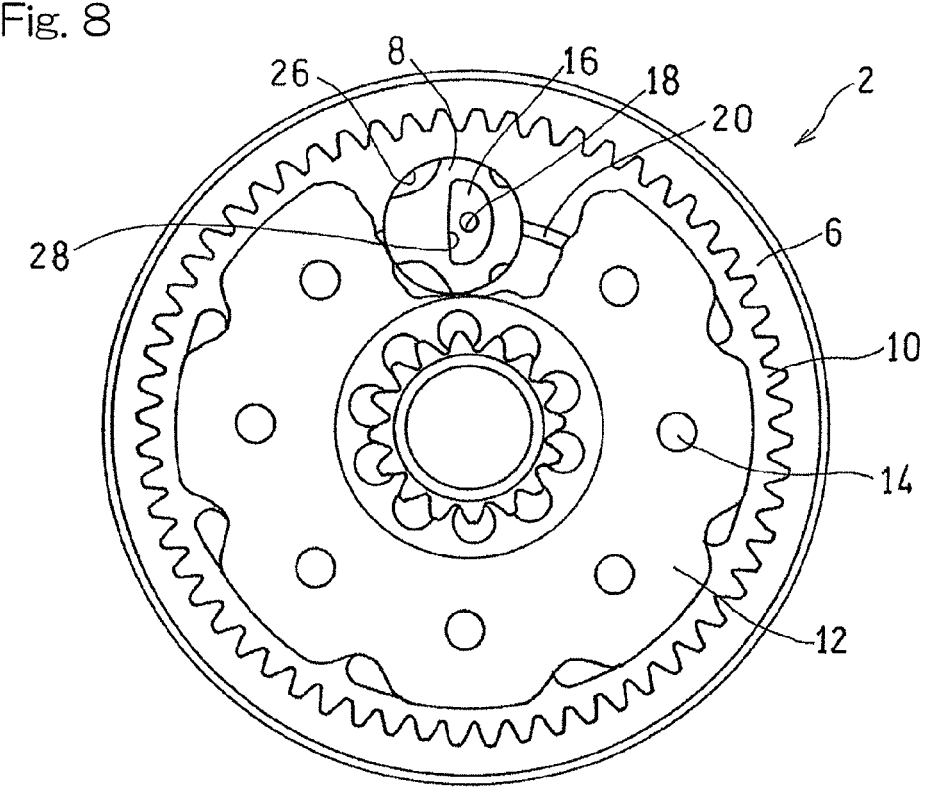
FIG. 8 is a rear view of a portion shown in FIG. 7 as viewed in the axial direction.

FIG. 4 is a longitudinal cross-sectional view of the clutch gear 10. FIG. 5 is a front view of the clutch gear 10 as viewed from the right side V in FIG. 4. The clutch gear 10 is made of a steel, and has an input tooth portion 22, having a large diameter, into which power of the engine E is inputted. As shown in FIG. 5, the clutch gear 10 has a plurality (eight in the present preferred embodiment) of accommodation holes 26 formed so as to be spaced from each other in the circumferential direction. The accommodation holes 26 penetrate through the clutch gear 10 in the axial direction as shown in FIG. 4. As shown in FIG. 8, the rib 20 of the clutch housing 6 is formed in such an annular shape as to be aligned with the center of each of the plurality of circular accommodation holes 26 when the clutch housing 6 and the clutch gear 10 overlap each other.

Figure 6:
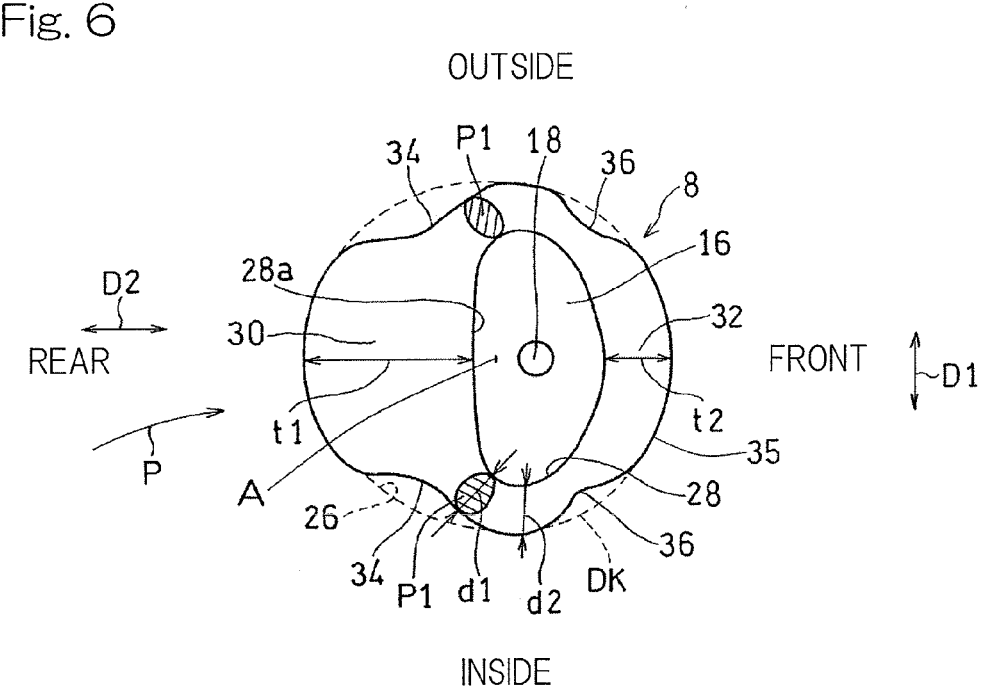
FIG. 6 is a front view of a damper of the clutch as viewed in the axial direction.

FIG. 6 is a front view of the damper 8 as viewed in the axial direction. The damper 8 is made of, for example, a rubber such as an NBR (nitrile rubber). The damper 8 is substantially disk-shaped and has a non-circular engagement hole 28 formed at the center portion thereof. The engagement hole 28 of the present preferred embodiment is substantially a D-shaped oval or long hole that is elongated in a clutch radial direction D1. The damper 8 has a front side portion 32 and a rear side portion 30, or a portion 30 at a trailing side in a rotational direction, to which the rotary drive power P from the clutch gear 10 is applied, such that the engagement hole 28 is disposed between the front side portion 32 and the rear side portion 30. A thickness t1, of the rear side portion 30, in a circumferential direction D2 is set so as to be greater than a thickness t2, of the front side portion 32, in the circumferential direction D2.

First cutout portions 34, 34 are formed on the outer side and the inner side, respectively, of the rear side portion 30, in the clutch radial direction D1. Each first cutout portion 34 is recessed, toward an axial center A of the disk DK, from the outer circumference of the disk DK, that is, from an outer circumferential surface 35 obtained by maximum diameter portions of the damper 8 being connected. A minimal distance d1 between the first cutout portion 34 and the engagement hole 28 is set so as to be smaller than a distance d2 between the engagement hole 28 and the outer circumferential surface 35 of the disk DK. A portion P1 of the first cutout portion 34, at which the minimal distance d1 is obtained, is positioned in the rear of a rear edge 28a of the engagement hole 28. The rear edge 28a of the engagement hole 28 extends almost linearly along the radial direction D1 of the damper 8. The minimal distance d1 portion has the smallest widthwise dimension as viewed from the front of the damper 8 in the axial direction in FIG. 6.

Second cutout portions 36, 36 are formed on the outer side and the inner side, respectively, of the front side portion 32 of the damper 8, in the clutch radial direction D1. Each second cutout portion 36 is also recessed from the outer circumference 35 of the disk DK toward the axial center A of the disk DK.

Figure 7:
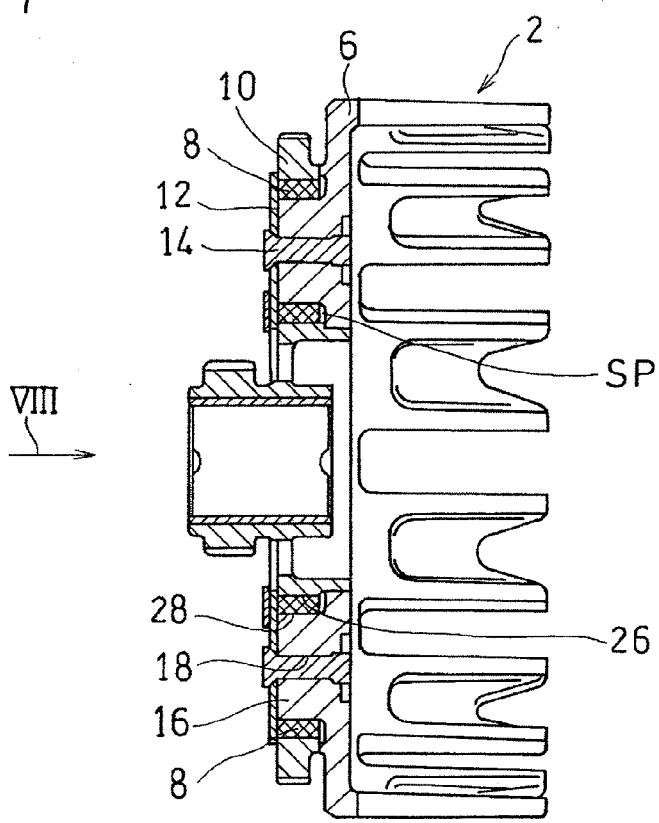
FIG. 7 is a longitudinal cross-sectional view of a main portion of the clutch.

FIG. 7 is a cross-sectional view illustrating a state where the clutch plates 4, the friction plates 5, the pressing plate 7, and the clutch hub 9 are removed in the state shown in FIG. 1. FIG. 8 is a front view as viewed from the left side VIII in FIG. 7. A plurality (eight in the present preferred embodiment) of the dampers 8 are equally spaced from each other in the circumferential direction. The engagement hole 28 of each of the dampers 8 engages with the corresponding engagement projection 16 of the clutch housing 6, and the entirety of each damper 8 is accommodated in the corresponding accommodation hole 26 of the clutch gear 10. In this state, a damper holder 12 formed as a steel plate member is disposed on the side, of the damper 8, opposite to the clutch housing 6 side, and a rivet 14 is inserted into the rivet insertion hole 18 of the clutch housing 6 and then crimped to stop the damper 8 from dropping.

Figure 9:
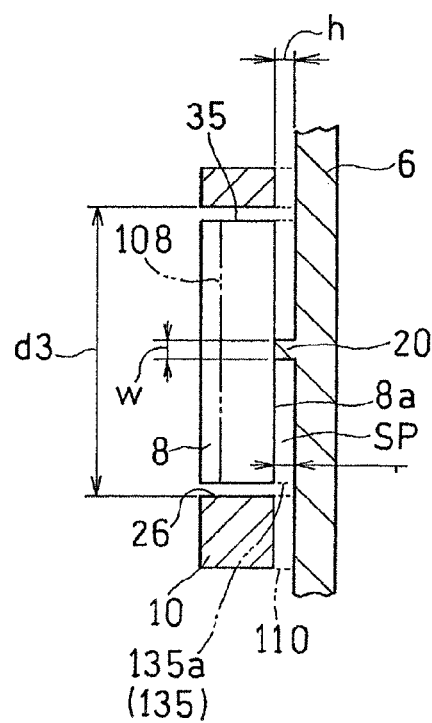
FIG. 9 is an enlarged longitudinal cross-sectional view of a main portion of the damper structure.

As shown in FIG. 7, a clearance SP in the axial direction is formed between the damper 8 and the clutch housing 6 in an assembled state. More specifically, as shown in FIG. 9, one end surface 8a, in the axial direction, of the damper 8 which faces the clutch housing 6 contacts with the rib 20 of the clutch housing 6, whereby the position, of the damper 8, in the axial direction is regulated to form the clearance SP.

A widthwise dimension w of the rib 20 in the radial direction is preferably set within the range of $\frac{1}{20}$ to $\frac{1}{5}$ of an inner diameter d3 of the accommodation hole 26. Further, a projection height h of the rib 20 in the accommodation hole 26 from the clutch housing 6 is preferably 0.5 mm to 1.5 mm.

In the above preferred embodiment, since the clutch housing 6 has the rib 20 that regulates the position, of the damper 8, in the axial direction, the position, of the damper 8, in the axial direction comes to be stable. Further, the clearance SP in the axial direction is formed between the damper 8 and the clutch housing 6. Therefore, when the damper 8 absorbs shock, in the circumferential direction, of the clutch 2, the damper 8 is deformed toward the clearance SP around the rib 20, and thus the deformation margin is assuredly obtained to exhibit damper effect, and also deterioration of the damper 8 due to compressive force is reduced to maintain the damper effect.

Even in the case of the clearance SP formed in the axial direction, if the rib 20 is not provided, the axial position of the damper 8 is unstable as indicated by a double dotted line 108. When the clutch gear 10 collides against the damper 108 that is offset to the position indicated by the double dotted line, a portion 135a of an outer circumferential surface 135 of the damper 108 is not pressed by the clutch gear 10 by a wall of the accommodation hole 26, to increase a load per unit area of the outer circumferential surface 135 of the damper 108 accordingly. In order to avoid this state, the dimension, of the clutch gear 10, in the axial direction needs to be increased by h, as indicated by a double dotted line 110, which increases the weight of the clutch gear 10 made of a steel.

In the above preferred embodiment, since the position, of the damper 8, in the axial direction is stabilized by the rib 20, the size of the outer circumferential surface 35 of the damper 8 to be pressed by the clutch gear 10 is constant, that is, the width in the axial direction is constant. Therefore, the dimension, of the clutch gear 10, in the axial direction need not be increased, and the weight of the clutch gear 10 is not increased.

As shown in FIG. 3, since the rib 20 is formed in an annular shape so as to be aligned with the plurality of accommodation holes 26, the rib 20 can be easily formed by molding.

Since the rib 20 shown in FIG. 3 is formed so as to connect to the engagement projections 16 of the clutch housing 6, the damper 8 can be stably supported in the clutch housing 6. Further, the root portions of the engagement projections 16 are reinforced by the rib 20.

The widthwise dimension w, of the rib 20, in the radial direction as shown in FIG. 9 is set within the range of $\frac{1}{20}$ to $\frac{1}{5}$ of the inner diameter d3 of the accommodation hole 26. When the widthwise dimension w, of the rib 20, in the radial direction is smaller than $\frac{1}{20}$ of the inner diameter d3 of the accommodation hole 26, the position, of the damper 8, in the axial direction is unstable. On the other hand, when the widthwise dimension w, of the rib 20, in the radial direction is greater than $\frac{1}{5}$ of the inner diameter d3 of the accommodation hole 26, the clearance SP is reduced, and the deformation margin for the damper 8 may not be sufficient.

Furthermore, the projection height h of the rib 20 is set within the range of 0.5 mm to 1.5 mm. When the projection height h is smaller than 0.5 mm, the clearance SP is reduced and the deformation margin for the damper 8 may not be sufficient. When the projection height h is greater than 1.5 mm, the size of the clutch 2 is increased in the axial direction.

As shown in FIG. 6, the minimal distance d1 between the first cutout portion 34 and the engagement hole 28 is set so as to be smaller than the distance d2 between the engagement hole 28 and the outer circumferential surface 35 of the disk DK. Thus, when the rotary drive power P is applied from the clutch gear 10 to the damper 8, the damper 8 is likely to be deformed forward through a narrow portion between the first cutout portion 34 and the engagement hole 28.

Figure 10:
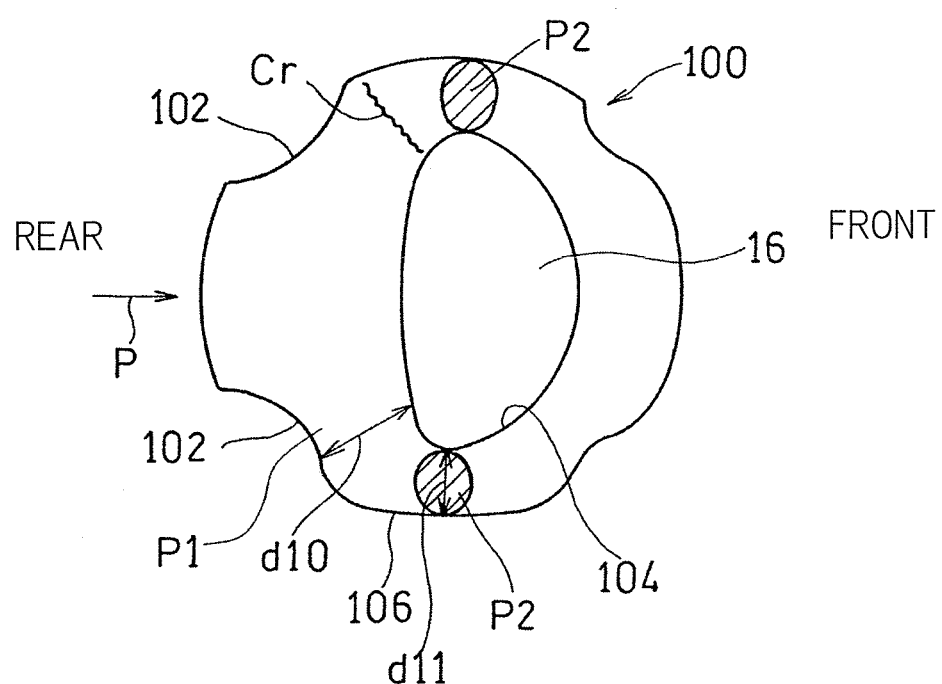
FIG. 10 is a front view of a conventional damper as viewed in the axial direction.

FIG. 10 is a front view of a conventional damper 100 as viewed in the axial direction. In the damper 100, a minimal distance d10 between a first cutout portion 102 and an engagement hole 104 is greater than a minimal distance d11 between the engagement hole 104 and an outer circumferential surface 106 of a disk. That is, a narrowest portion P2 at which the width is minimal is formed in front of the portion P1 at which the minimal distance d10 is obtained.

When the rotary drive power P acts on the damper 100, a rear side portion of the damper 100 is compressed with respect to the engagement projection 16 and greatly deformed. However, the compressive force cannot be sufficiently absorbed at the narrowest portion P2, and is conveyed into the narrowest portion P2, whereby the force concentrates in a portion in the rear of the narrowest portion P2. As a result, a crack Cr may be generated in the rear side portion of the damper 100.

On the other hand, in the above preferred embodiment, as shown in FIG. 6, the portion P1 at which the minimal distance d1 is obtained, that is, the portion P1 that is the narrowest portion is formed in the rear side portion 30. Therefore, the compressive force can be sufficiently absorbed between a portion of the damper 8 positioned in the rear of the engagement projection 16 and the engagement projection 16. In addition, since the narrowest portion is not formed in front of the portion P1, the damper 8 can be easily deformed forward. As a result, generation of the crack Cr in the damper 8 can be avoided.

Since the first cutout portions 34 shown in FIG. 6 are recessed from the outer circumference 35 of the disk DK toward the axial center A of the disk DK, the first cutout portions 34 can be easily formed.

Since the second cutout portions 36 are formed in the front side portion 32 of the damper 8, the damper 8 can be deformed toward space formed by the second cutout portions 36. Thus, the damper 8 is likely to be deformed forward, and generation of the crack Cr can be reduced with enhanced effectiveness.

The present invention is not limited to the embodiment described above, and various additions, modifications, or deletions may be made without departing from the gist of the invention. Therefore, these are construed as included within the scope of the present invention.

REFERENCE NUMERALS

2 . . . clutch
4 . . . clutch plate
6 . . . clutch housing
8 . . . damper
10 . . . clutch gear
16 . . . engagement projection
20 . . . rib
26 . . . accommodation hole
28 . . . engagement hole
h . . . projection height of rib
d3 . . . inner diameter of accommodation hole
w . . . widthwise dimension of rib in radial direction

What is claimed is:

1. A damper structure for a clutch, comprising:
a clutch housing configured to hold a plurality of clutch plates;
a clutch gear configured to transmit rotary drive power to the clutch housing via a damper; and
an annular rib provided in the clutch housing and configured to regulate a position of the damper in an axial direction of the clutch housing, the rib is a protrusion projecting, in an axial direction, from an end surface of the clutch housing towards the damper and a tip end surface of the rib is configured to contact with an end surface, in the axial direction, of the damper which faces the clutch housing, wherein:
the clutch housing has engagement projections that engage with engagement holes formed in a plurality of the dampers; and
the annular rib is aligned with the engagement projections and the annular rib and the engagement projections are integrally formed with the clutch housing.

2. The damper structure for the clutch as claimed in claim 1, wherein:
a plurality of the dampers are accommodated in a plurality of accommodation holes that are spaced from each other in a circumferential direction of the clutch gear; and
the rib is formed in an annular shape so as to be aligned with the plurality of accommodation holes.

3. The damper structure for the clutch as claimed in claim 2, wherein a projection height of the rib in each accommodation hole is set within the range of 0.5 mm to 1.5 mm.

4. A damper structure for a clutch, comprising:
a clutch housing configured to hold a plurality of clutch plates, the clutch housing having engagement projections that engage with engagement holes formed in a plurality of dampers, wherein each of the plurality of the dampers are accommodated in a plurality of accommodation holes that are spaced from each other in a circumferential direction of a clutch gear;
a clutch gear configured to transmit rotary drive power to the clutch housing via the dampers; and
an annular rib configured to regulate a position of the dampers in an axial direction of the clutch housing and to connect with the engagement projections, wherein the annular rib is formed in an annular shape so as to be aligned with the plurality of accommodation holes and a widthwise dimension of the annular rib is set within the range of 1/20 to 1/5 of an inner diameter of the accommodation hole.

5. The damper structure for the clutch as claimed in claim 4 wherein a projection height of the annular shape rib in each accommodation holes is set within a range of 0.5 mm to 1.5 mm.

6. A damper structure for a clutch, comprising:
a clutch housing configured to hold a plurality of clutch plates;
a clutch gear configured to transmit rotary drive power to the clutch housing via a damper; and
a rib provided in the clutch housing and configured to regulate a position of the damper in an axial direction of the clutch housing, wherein
a plurality of the dampers are accommodated in a plurality of accommodation holes that are spaced from each other in a circumferential direction of the clutch gear, and the rib is formed in an annular shape so as to be aligned with the plurality of accommodation holes, and a widthwise dimension of the rib in a radial direction is set within the range of 1/20 to 1/5 of an inner diameter of the accommodation hole.

* * * * *